(12) United States Patent
Yokota et al.

(10) Patent No.: US 6,528,279 B2
(45) Date of Patent: Mar. 4, 2003

(54) METHOD AND APPARATUS FOR ANALYZING THREE-DIMENSIONAL INTERNAL STRUCTURE

(75) Inventors: Hideo Yokota, Wako (JP); Akitake Makinouchi, Wako (JP); Toshiro Higuchi, Yokohama (JP); Yutaka Yamagata, Wako (JP)

(73) Assignee: Riken (JP)

( * ) Notice: Subject to any disclaimer, the term of this patent is extended or adjusted under 35 U.S.C. 154(b) by 47 days.

(21) Appl. No.: 09/852,912

(22) Filed: May 11, 2001

(65) Prior Publication Data

US 2002/0058300 A1 May 16, 2002

(30) Foreign Application Priority Data

Nov. 15, 2000 (JP) ........................................ 2000-347398

(51) Int. Cl.[7] .......................... G01N 1/30; G01N 33/48; G01N 1/06; G01N 1/28; G02B 21/18
(52) U.S. Cl. ..................... 435/40.5; 359/372; 382/128
(58) Field of Search ..................... 435/40.5; 382/128; 359/372

(56) References Cited

U.S. PATENT DOCUMENTS 5,455,870 A * 10/1995 Sepai et al. ................. 382/147
6,081,577 A * 6/2000 Webber ...................... 378/23

FOREIGN PATENT DOCUMENTS

JP          07-109384 A      4/1995

* cited by examiner

Primary Examiner—Herbert J. Lilling
(74) Attorney, Agent, or Firm—Griffin & Szipl, P.C.

(57) ABSTRACT

A sample extrusion device 12 for sequentially extruding a sample 1 in a predetermined direction, a sample cutting device 14 for sequentially cutting the extruded sample, and a con-focal image pickup device 16 for focusing an illuminating light at a section portion that was cut to pick up two-dimensional images of the cut section from a reflected light thereof are provided to reconstruct an internal structure of the sample from many two-dimensional images (continuous section images) that differ in the cutting positions. The sample can be continuously cut to continuously observe the sectional images thereof under no influence of the sample being seen transparently, the entirety of the sample can be observed in almost the same condition even though the sample is colored with a fluorescent dye, and thereby, the internal structure of the sample can be reconstructed with a high precision.

3 Claims, 5 Drawing Sheets

CONTINOUS SECTIONAL IMAGES

RECONSTRUCTED THREE-DIMENSIONAL INTERNAL STRUCTURE

Prior Art    Present Invention

METHOD AND APPARATUS FOR ANALYZING THREE-DIMENSIONAL INTERNAL STRUCTURE

BACKGROUND OF THE INVENTION

1. Field of the Invention

The present invention relates to a method and an apparatus for analyzing a three-dimensional internal structure of an internal structure of a sample such as an organism.

2. Description of the Related Art

Heretofore, as means for analyzing an internal structure of a sample such as an organism, a thin specimen is prepared from the sample to observe this specimen by a microscope or the like, or the sample is cut to observe its section by a microscope or a CCD camera. For example, in order to observe a cellular tissue, the cellular tissue is cut into thin slices by a microtome or the like, and observation is then made through a microscope.

However, such conventional means only permits a given section of the sample to be observed. Therefore, in the case of analyzing the internal structure of the sample from the sectional structures of the sample, it is necessary that many specimens should be prepared, and hence, a lot of time and a high technology are required.

On the other hand, as means for observing the internal structure of the sample by a non-destructive method without cutting the sample, an X-ray CT, a MRI (Magnetic Resonance Imaging) and a con-focal laser microscope are known. However, a resolution of the X-ray CT and the MRI is low, and there is a defect that any color information of the sample cannot be obtained. Furthermore, the con-focal laser microscope has a problem that the depth of an object to be observed depends on the transparency of the sample, and even if the transparency of the sample is high, the observable depth is limited to about 100 $\mu$m, so that the sample having a size more than 1 mm cannot be observed.

In order to solve the conventional problems set forth above, the inventors of the preset invention have previously invented "an automated inspection apparatus comprising a sample surface cutting-out device" and have filed a patent application (Japanese examined Patent Publication No. 109384/1995). This automated inspection apparatus is disposed so as to be adjacent to a device such as a microtome for forming the slices of the sample, and it is equipped with an observation device and an analysis device. According to this kind of inspection apparatus, the sample is continuously cut to photograph its sectional images, and the internal structure of the sample is then reconstructed on the basis of the respective sectional images. Incidentally, this automated inspection apparatus is hereinafter called "a three-dimensional internal structure microscope".

However, in the three-dimensional internal structure microscope, a light source is arranged above the sample to observe a reflected light. In consequence, there is a problem that, in the case that the transparency of the sample is high, the light reflected from the lower side of the section to be observed is also simultaneously observed, so that it is difficult to observe the cut section alone. That is to say, an observation performance depends on the transparency of the sample, and the observed sectional images are in a fuzzy state, so that it is difficult to observe the sample with a high precision.

Furthermore, in the case of carrying out a fluorescence observation of the sample, there is a problem that the fluorescence gradually deteriorates due to an illumination light which has penetrated into the inside of the transparent sample, so that the whole of the sample cannot be observed under the same fluorescent conditions.

SUMMARY OF THE INVENTION

The present invention has been developed to solve such problems. That is to say, an object of the present invention is to provide a method and an apparatus for analyzing a three-dimensional internal structure in which a sample can be continuously cut to continuously observe its sectional image without depending on the transparency of the sample, and even if the sample is colored with a fluorescent dye, the whole of the sample can be observed under about the same conditions, whereby the internal structure of the sample can be reconstructed with a high precision from the respective sectional images.

According to a first aspect of the present invention, there is provided a method for analyzing a three-dimensional internal structure comprising a sample extrusion step (a) for sequentially extruding a sample in a predetermined direction, a sample cutting step (b) for sequentially cutting the extruded sample, and a con-focal image pickup step (c) for focusing an illuminating light in the cut section portion to pick up the two-dimensional image of the cut section from a reflected light thereof.

Furthermore, according to a second aspect of the present invention, there is provided an apparatus for analyzing a three-dimensional internal structure comprising a sample extrusion device for sequentially extruding a sample in a predetermined direction, a sample cutting device for sequentially cutting the extruded sample, and a con-focal image pickup device for focusing an illuminating light in the cut section portions to pick up the two-dimensional image of the cut section from a reflected light thereof.

In accordance with the above-mentioned method and apparatus of the present invention, a sample can sequentially be extruded by the sample extrusion device and then sequentially cut by the sample cutting device, and the images of the sections thereof can sequentially be picked up by the con-focal image pickup device. Moreover, by scanning focal points by the con-focal image pickup device, the two-dimensional images of the whole of the cut section can be obtained, whereby the internal structure of the sample can be reconstructed from many two-dimensional images at different cut positions.

In addition, since the illuminating light is focused in the section portions cut by the con-focal image pickup device to observe the reflected light thereof, there is a less influence of the light in positions other than the focal position (e.g., the transparency of the sample). In consequence, the resolution of the two-dimensional images picked up can be enhanced to thereby reconstruct the internal structure of the sample with a high precision.

Furthermore, since the illuminating light is diffused in positions other than the focal positions and grows faint, a fluorescent dye in positions other than the focal point portion scarcely fades, even if the sample is colored with the fluorescent dye. Accordingly, the whole of the sample can be observed under about the same conditions.

In accordance with a preferred embodiment of the present invention, the illuminating light is a laser light. This constitution permits the laser light to be precisely focused in a predetermined position of the cut section portion (e.g., the surface of the section portion or a position apart as much as a certain distance from the surface), thereby enhancing the resolution of the picked-up images.

Furthermore, a data processor that operates the three-dimensional internal structure of the sample from the plurality of two-dimensional images, and a display that displays output data of the above data processor may be provided. Such a data processor permits the three-dimensional internal structure of the sample to be smoothly operated from many two-dimensional images (continuous sectional images) in different cut positions obtained by the con-focal image pickup device, and the output data thereof can be displayed by the display.

The con-focal image pickup device comprises a Nipkow's disc having a plurality of pinholes, a micro lens disc having a plurality of micro lenses at the positions corresponding to the pinholes of the Nipkow's disc, and a rotary device that integrally rotates the Nipkow's disc and the micro lens disc. The thus established con-focal image pickup device gathers the laser light at respective corresponding pinholes by the plurality of micro lenses.

According to this constitution, the whole of the section in which the focal point of the laser light is severed can be scanned only by rotating the rotary device at high speed to obtain the two-dimensional images of the whole of the cut section in a short time.

The other objects and advantageous features of the present invention will be apparent from the following description in reference to the attached drawings.

DETAILED DESCRIPTION OF THE PREFERRED EMBODIMENTS

Figure 1:
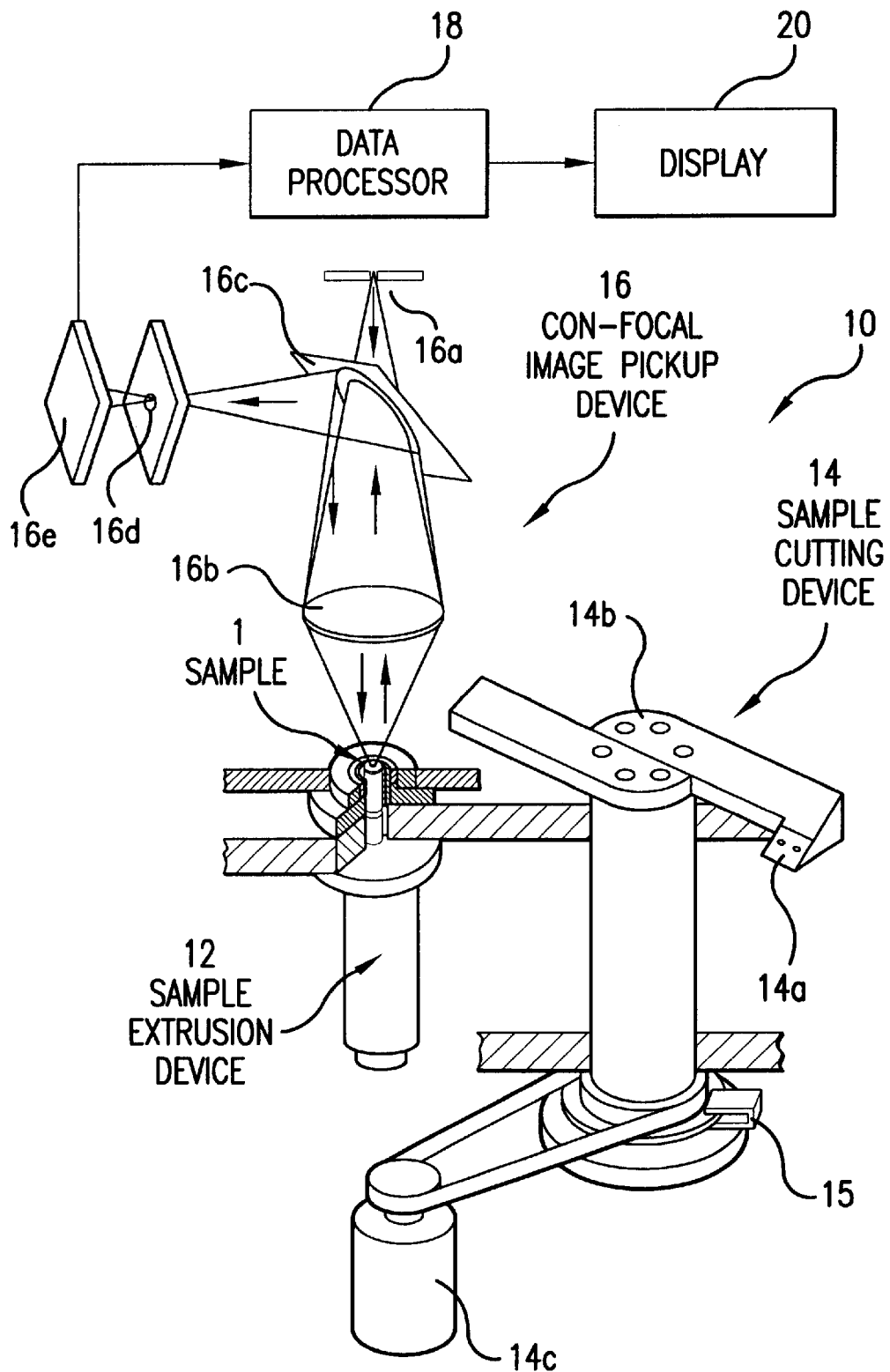
FIG. 1 shows a first embodiment of a three-dimensional internal structure analysis apparatus according to the present invention.

Hereinafter, the preferred embodiments of the present invention will be described referring to the drawings. It is to be noted that the same reference numbers are attached to common components in the respective drawings.

FIG. 1 shows a first embodiment of a three-dimensional internal structure analysis apparatus according to the present invention. As shown in this drawing, a three-dimensional internal structure analysis apparatus 10 of the present invention comprises a sample extrusion device 12, a sample cutting device 14, a con-focal image pickup device 16, a data processor 18 and a display 20.

The sample extrusion device 12 is a direct acting device, for example, using a stepping motor and a ball screw, and it is adapted to sequentially extrude a sample 1 in a predetermined direction (an upward direction in this drawing).

In the sample cutting device 14 of this embodiment, a cutting arm 14b having a knife 14a is horizontally rotated by a drive 14c (e.g., a motor and a belt) to sequentially cut the extruded sample 1. Moreover, reference numeral 15 is an encoder, which always detects a rotation position of the cutting arm 14b.

In a con-focal image pickup device 16 of this embodiment, an illuminating light of a light source 16a is focused at the cut section portion of the sample 1 by an objective lens 16b, and the reflected light is horizontally reflected by a beam splitter 16c, passed through a pinhole window 16d, and then detected by a detector 16e. Furthermore, the beam splitter 16c is swung to scan the focal position of the illuminating light, thereby picking up the two-dimensional images of the cut sections.

The data processor 18, which is, for example, a computer, stores in a memory many two-dimensional images obtained in the con-focal image pickup device 16, and operates the three-dimensional internal structure of the sample from these images to reconstruct the internal structure of the sample 1. The display 20 outputs and displays the internal structure of the sample 1 reconstructed in the data processor 18.

Figure 2:
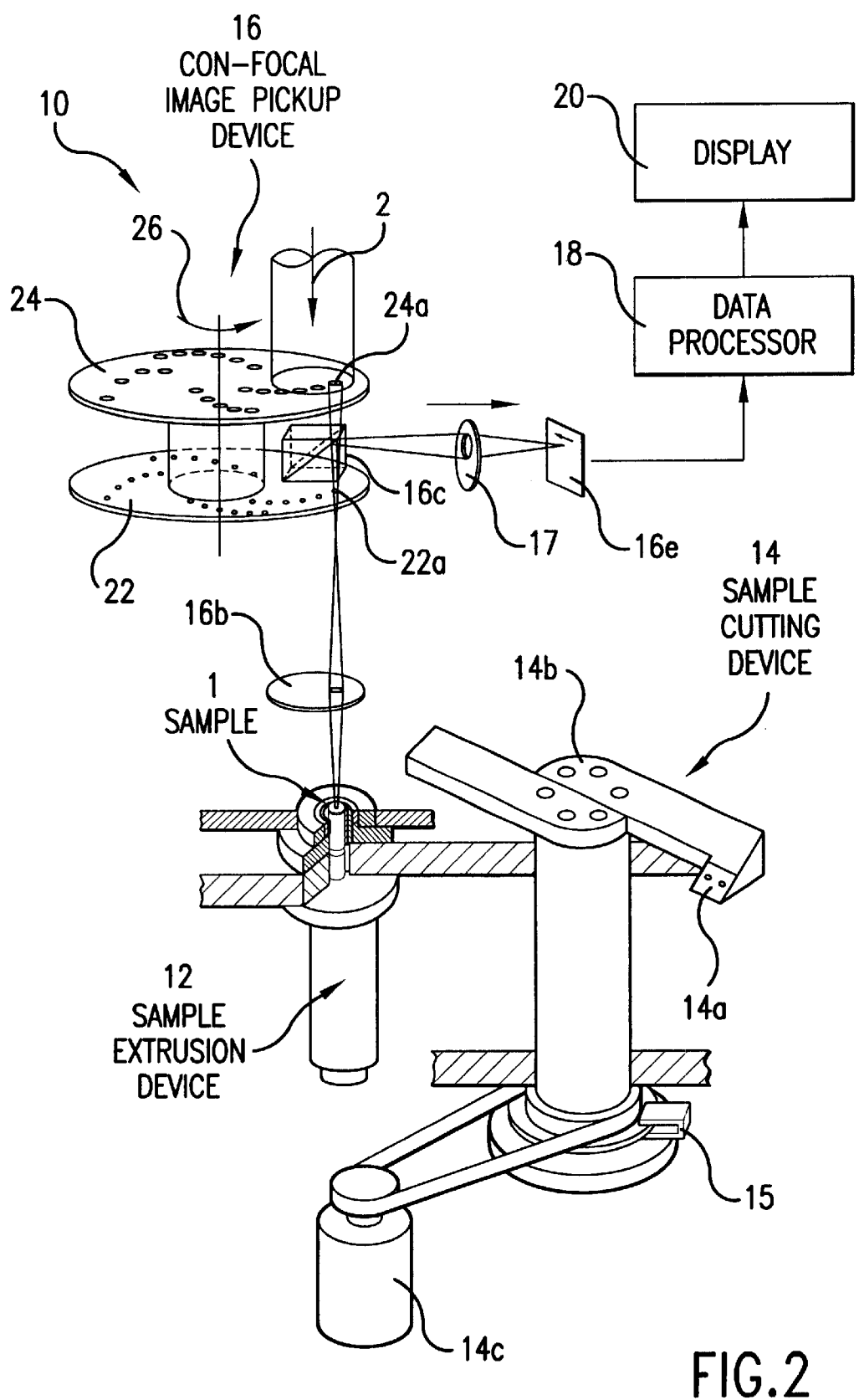
FIG. 2 shows a second embodiment of a three-dimensional internal structure analysis apparatus according to the present invention.

FIG. 2 shows a second embodiment of a three-dimensional internal structure analysis apparatus according to the present invention. In this drawing, the con-focal image pickup device 16 comprises a Nipkow's disc 22 having a plurality of pinholes 22a, a micro lens disc 24 having a plurality of micro lenses 24a at the positions corresponding to the pinholes 22a of the Nipkow's disc, and a rotary device 26 that integrally rotates the Nipkow's disc 22 and the micro lens disc 24. It is to be noted that the other dispositions are the same as in FIG. 1.

According to this constitution, a laser light 2 is focused at the respective corresponding pinholes 22a by the plurality of micro lenses 24a, and the laser light 2 passed through the plurality of pinholes 22a is focused at the cut section portions of the sample 1 by the objective lens 16b. Afterward, the reflected light is passed through a lens 17 with the aid of the beam splitter 16c, and then detected in the detector 16e, whereby the reflected lights from the plurality of points on the cut section portion are simultaneously detected. In this embodiment, the detector 16e is preferably a CCD in which the detector is arranged in a two-dimensional manner.

Furthermore, the whole of the section in which the focal point of the laser light is severed can be scanned only by rotating the Nipkow's disc 22 and the micro lens disc 24 by the rotary device 26 to obtain the two-dimensional images of the whole of the cut section in a short time.

Figure 3A:
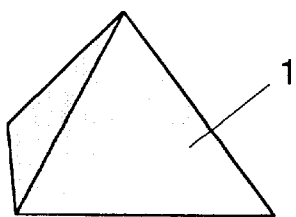
FIG. 3A to FIG. 3D are illustrative views of a three-dimensional internal structure analysis method according to the present invention.

FIG. 3A to FIG. 3D are illustrative views of a three-dimensional internal structure analysis method according to the present invention. In the method of the present invention, as shown in FIG. 3A, the sample 1 is fastened by freezing or the like as a pretreatment, colored by a general staining technique or a fluorescent staining technique, and then embedded.

Figure 3B:
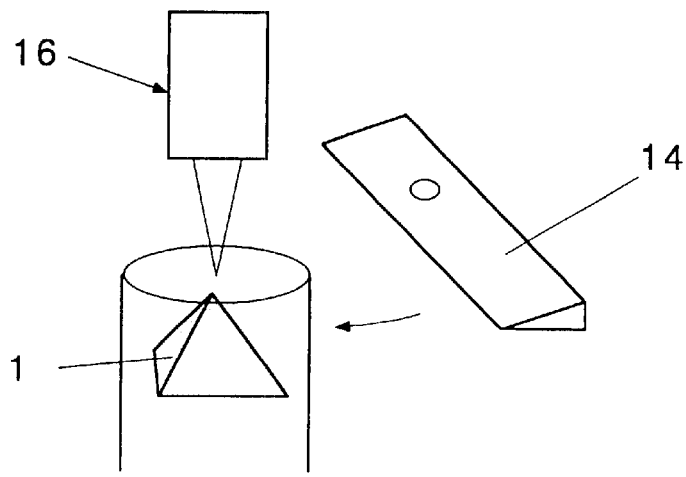
Figure 3C:
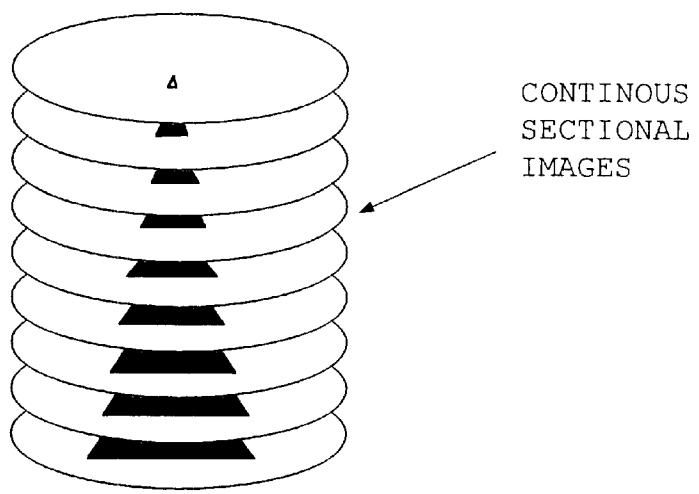
Figure 3D:
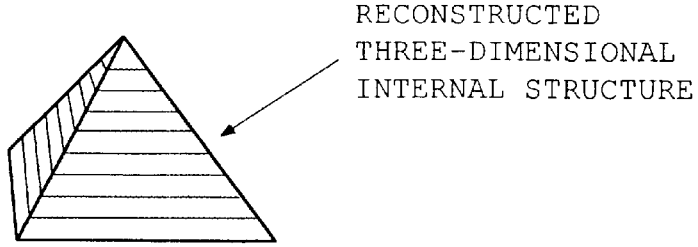

Next, as shown in FIG. 3B, there are sequentially carried out a sample extrusion step (a) for sequentially extruding the sample 1 in a predetermined direction, a sample cutting step (b) for sequentially cutting the extruded sample, and a con-focal image pickup step (c) for focusing the illuminating light in the cut section portions to pick up two-dimensional images of the cut sections from the reflected light thereof. As a result, such a continuous sectional images as shown in FIG. 3c are obtained. Furthermore, these continuous section images are processed by the data processor 18 to display the three-dimensional internal structure of the sample on the display 20.

In accordance with the present invention, the illuminating light is focused only in the cut section portions by the con-focal image pickup device 16 to observe the reflected light thereof, so that there scarcely exists the influence of the light from positions other than this focal position (e.g., the transparency of the sample). In consequence, the resolution of the picked-up two-dimensional images can be enhanced, which fact permits reconstructing the internal structure of the sample with a high precision.

Figure 4A:
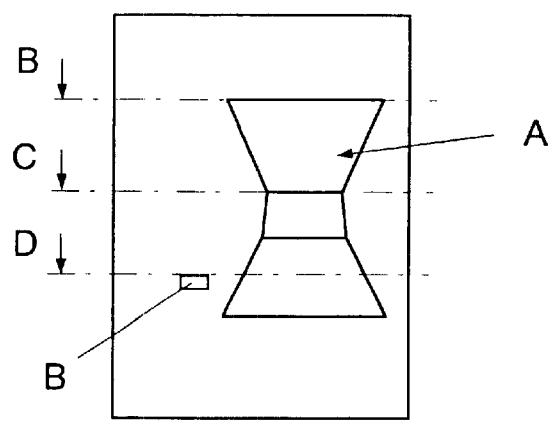
FIG. 4A to FIG. 4D are schematic views illustrating the differences of images between the present invention and the prior art.
Figure 4B:
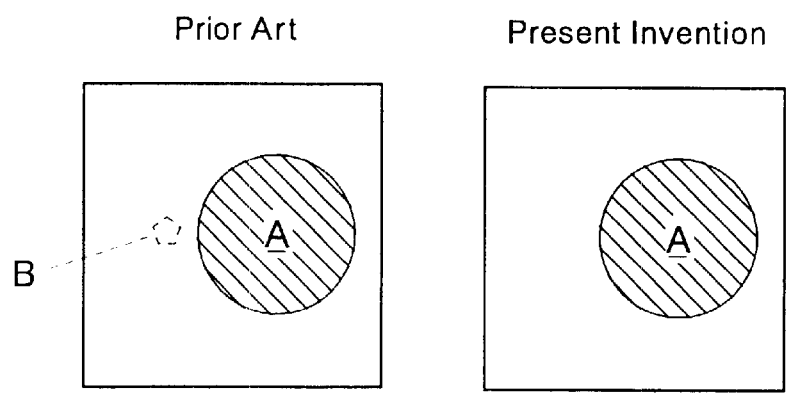
Figure 4C:
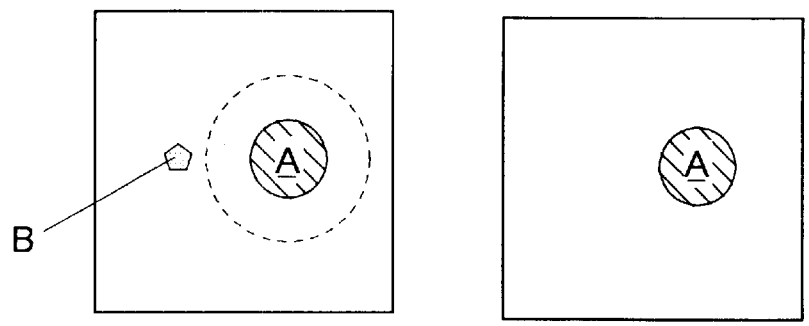
Figure 4D:
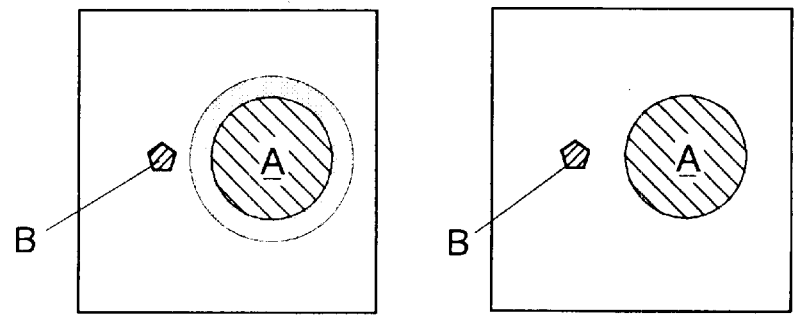

FIG. 4A to FIG. 4D are schematic views illustrating the differences of images between the present invention and the prior art. In these drawings, FIG. 4A shows the cut sections B, C and D of the sample A, and a pentagonal sample B. In addition, FIGS. 4B, 4C and 4D show the images corresponding to the respective sections wherein the images obtained by a conventional three-dimensional internal structure microscope are on the left side, and the images obtained by the three-dimensional internal structure microscope of the present invention are on the right side.

In the cut section B of the prior art, the image of the sample B is picked up in a transparent state. Additionally, in the cut section C, the sample B and the lower portion of the sample A are also picked up in the transparent state. Furthermore, in the cut section D, the sample A and the sample B are picked up, but the lower portion of the sample A is similarly picked up in the transparent state. On the contrary, in the respective cut sections B, C and D of the present invention, only the sample A and the sample B exposed to the cut sections are picked up.

EXAMPLES

Hereinafter, an embodiment of the present invention will be described in detail.

EXPERIMENTAL APPARATUS

In this embodiment, devices shown in FIG. 2 were employed. Among these devices, a con-focal microscope was used as a con-focal image pickup device 16.

An observable sample is a column having a diameter of 8 mm and a length of 10 mm. A mounted sample 1 was carried upwards by a direct acting mechanism using a servomotor and a ball screw, and the top end thereof was cut with a knife 14a attached to a spindle that rotates. This cutting surface was recorded in a write once laser disk via a CCD camera by use of an objective lens. And, an argon laser was employed as a source light, a filter set of 488 nm was used, and a high sensitive CCD camera (ICD-8000: IKEGAMI) was used for photographing.

EXPERIMENTAL METHOD

As an observation object was used a spongy cellulose bulb with 100$\mu$m in diameter( micro carrier: Asahikasei) colored with a FITC. The colored micro carrier was embedded in an OCT compound and processed for a frost embedding at −35° C. The frozen sample was inserted into and fastened to the apparatus of FIG. 2, was photographed by use of an objective lens with 500 times (M Plan ApoSL: Mitsutoyo), the con-focal laser microscope and the three-dimensional internal structure microscope to make a comparative examination as to whether the lower layer was seen transparently.

RESULT AND STUDY

Figure 5A:
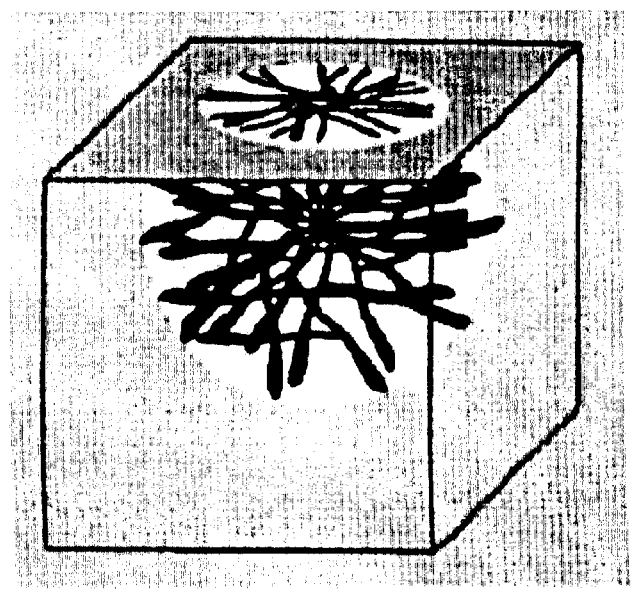
FIG. 5A and FIG. 5B show examples of images obtained by embodiments of the present invention.
Figure 5B:
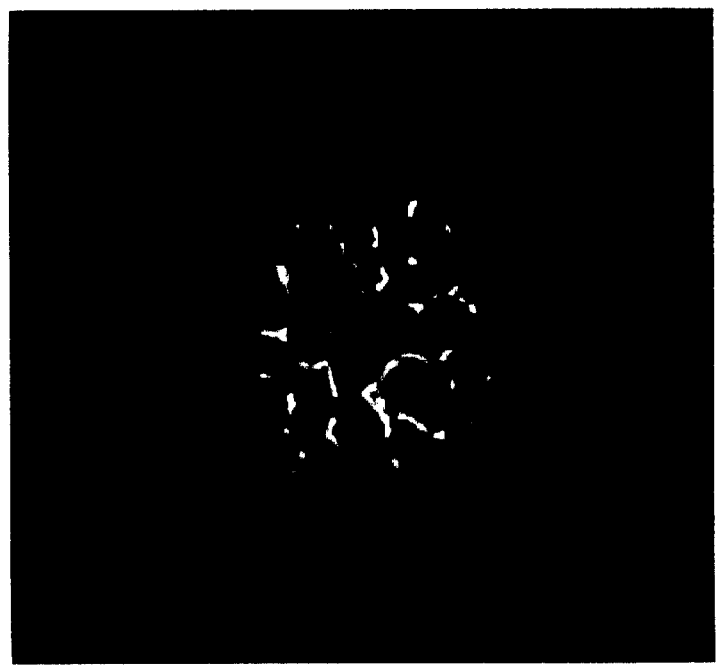

The micro carrier processed for the frost embedding was cut sequentially from the upper side with the apparatus of FIG. 2. In FIG. 5A is illustrated a type view of the micro carrier, and in FIG. 5B is illustrated the image of the same section that was cut from the upper side by a half of a sphere of 50 $\mu$m, which was observed with the con-focal laser microscope and the three-dimensional internal structure microscope.

The section concurrently observed with the conventional fluorescence microscope appeared fuzzy because the lower layer was seen transparently, and the image having a contrast that was identifiable on a paper was impossible to obtain.

To the contrary, in the observation in accordance with the present invention, it is seen that a fuzziness of the lower layer is removed and the spongy cellulose is identifiable. Furthermore, a lateral resolution also has been improved.

From the facts above, it is thought that the method and the apparatus of the present invention are advantageous in observing fluorescent substances. Also, the opaque sample with 100 $\mu$m in diameter is difficult to observe with the conventional con-focal laser microscope, and therefore, the method and the apparatus of the present invention that combined the con-focal laser microscope and the three-dimensional internal structure microscope allows the both defects of the lower layer being seen transparently in the con-focal laser microscope and of a restriction to the depth-direction observation in the con-focal laser microscope to be compensated to improve performance of the microscope, thus enabling a more detailed observation of bio-samples.

As set forth above, the method and the apparatus of the present invention are a method and an apparatus that combined the three-dimensional internal structure microscope and the con-focal laser microscope. In this method and apparatus, the respective defects of the conventional apparatuses can be compensated, no limit to the depth direction is present, the observation is possible to make in which the lower layer is not seen transparently, and the internal structure of the sample is possible to observe with a high precision.

Namely, the present invention enables the observation in which no limit to the depth direction is present and no lower layer is seen transparently. Also, in principle, the present invention allows the observation having a high resolution of 1 $\mu$m to be made at a high speed and conveniently in the observation of the three-dimensional structure of the internal of the sample.

Accordingly, the method and the apparatus for analyzing the three-dimensional internal structure of the present invention have an excellent advantage: The sample can be cut continuously to continuously observe the sectional images thereof under no influence of the sample being seen transparently; the entirety of the sample can be observed in almost the same condition even though the sample is colored with a fluorescent dye; thereby, the internal structure of the sample can be reconstructed with a high precision; and so forth.

In addition, the present invention has been described herein in terms of several preferred embodiments, and it is to be understood that the scope of the right that is included in the present invention is not to be limited to that of theses examples. To the contrary, the scope of the right of the present invention is to include all modifications, variations and equivalents that are included in the appended claims.

What is claimed is:

1. A method for analyzing a three-dimensional internal structure, comprising the steps of:
   providing an apparatus for analyzing a three-dimensional internal structure wherein the apparatus comprises a sample extrusion device that operates to sequentially extrude a sample in a predetermined direction, a sample cutting device that operates to sequentially cut an extruded sample, and a con-focal image pickup device that operates to focus illuminating light onto portions of a cut section and operates to capture light reflected from the illuminated cut section to form a two-dimensional image;

providing a sample having a three-dimensional internal structure;

sequentially extruding the sample in a predetermined direction using the sample extrusion device of the apparatus for analyzing a three-dimensional structure;

sequentially cutting the extruded sample to generate a plurality of cut sections using the sample cutting device of the apparatus for analyzing a three-dimensional structure; and generating a two-dimensional image of each cut section by focusing illuminating light onto each cut section and subsequently capturing the light reflected respectively from each cut section using the con-focal image pickup device of the apparatus for analyzing a three-dimensional image.

2. A method for analyzing a three-dimensional internal structure according to claim 1, wherein the two-dimensional image is generated by focusing laser light as the illuminating light onto each cut section and the con-focal image pickup device is a con-focal microscope so that the reflected light is captured by the con-focal microscope.

3. A method for analyzing a three-dimensional internal structure according to claim 2, wherein the apparatus for analyzing a three-dimensional internal structure further comprises a data processor for generating a three-dimensional internal structure from a plurality of images and a display for displaying a three-dimensional internal structure, and the method further comprises:

processing the two-dimensional image of each cut section of the plurality of cut sections to generate a three-dimensional internal structure by using the data processor; and displaying the three-dimensional image on the display.

* * * * *